United States Patent
Yokoyama

(10) Patent No.: US 12,517,332 B2
(45) Date of Patent: Jan. 6, 2026

(54) LENS APPARATUS AND IMAGE PICKUP APPARATUS HAVING THE SAME

(71) Applicant: CANON KABUSHIKI KAISHA, Tokyo (JP)

(72) Inventor: Takayoshi Yokoyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 297 days.

(21) Appl. No.: 18/495,881

(22) Filed: Oct. 27, 2023

(65) Prior Publication Data

US 2024/0159994 A1 May 16, 2024

(30) Foreign Application Priority Data

Nov. 11, 2022 (JP) .................................. 2022-180795

(51) Int. Cl.
*G02B 13/06* (2006.01)
*G02B 17/08* (2006.01)

(52) U.S. Cl.
CPC ............. *G02B 13/06* (2013.01); *G02B 17/08* (2013.01)

(58) Field of Classification Search
CPC ......... G02B 13/06; G02B 17/08; G02B 13/18
See application file for complete search history.

(56) References Cited

U.S. PATENT DOCUMENTS

| 2014/0022417 | A1 | 1/2014 | Yokoyama |
| 2016/0349482 | A1 | 12/2016 | Yokoyama |
| 2020/0014908 | A1* | 1/2020 | Ebe .......................... G02B 9/12 |
| 2022/0221688 | A1 | 7/2022 | Yokoyama |
| 2023/0013707 | A1 | 1/2023 | Yokoyama |
| 2023/0251460 | A1 | 8/2023 | Yokoyama |
| 2024/0103353 | A1 | 3/2024 | Yokoyama |

FOREIGN PATENT DOCUMENTS

JP 2015-129973 A 7/2015

* cited by examiner

*Primary Examiner* — James C. Jones
(74) *Attorney, Agent, or Firm* — Carter, DeLuca & Farrell LLP

(57) ABSTRACT

A lens apparatus includes a first optical system, and a second optical system. The first optical system includes a first reflective optical element configured to reflect light incident along a first direction from an object side toward an image side along a second direction. The second optical system includes a second reflective optical element configured to reflect light incident from the object side along a third direction different from the first direction toward the image side along the second direction. An intermediate imaging point and an image point are formed by each of the first optical system and the second optical system. A predetermined inequality is satisfied.

21 Claims, 7 Drawing Sheets

COMPARATIVE EXAMPLE

LENS APPARATUS AND IMAGE PICKUP APPARATUS HAVING THE SAME

BACKGROUND

Technical Field

One of the aspects of the embodiments relates to a lens apparatus and an image pickup apparatus having the same.

Description of Related Art

One conventional configuration can generate an image with a wide angle of view by processing (stitching processing) of stitching captured images acquired by a plurality of optical systems (see Japanese Patent Laid-Open No. 2015-129973). The configuration disclosed in Japanese Patent Laid-Open No. 2015-129973 requires image sensors as many as the optical systems, causes color differences, luminance differences, and the like between captured images due to variations of the image sensors, and bears a heavy load for correcting them in the stitching processing.

SUMMARY

A lens apparatus according to one aspect of the embodiment includes a first optical system, and a second optical system. The first optical system includes a first reflective optical element configured to reflect light incident along a first direction from an object side toward an image side along a second direction. The second optical system includes a second reflective optical element configured to reflect light incident from the object side along a third direction different from the first direction toward the image side along the second direction. An intermediate imaging point and an image point are formed by each of the first optical system and the second optical system. The following inequality is satisfied:

$$180° < 2\omega < 270°$$

where $\omega(°)$ is a half angle of view of each of the first optical system and the second optical system.

Further features of the disclosure will become apparent from the following description of embodiments with reference to the attached drawings.

DESCRIPTION OF THE EMBODIMENTS

Figure 1:
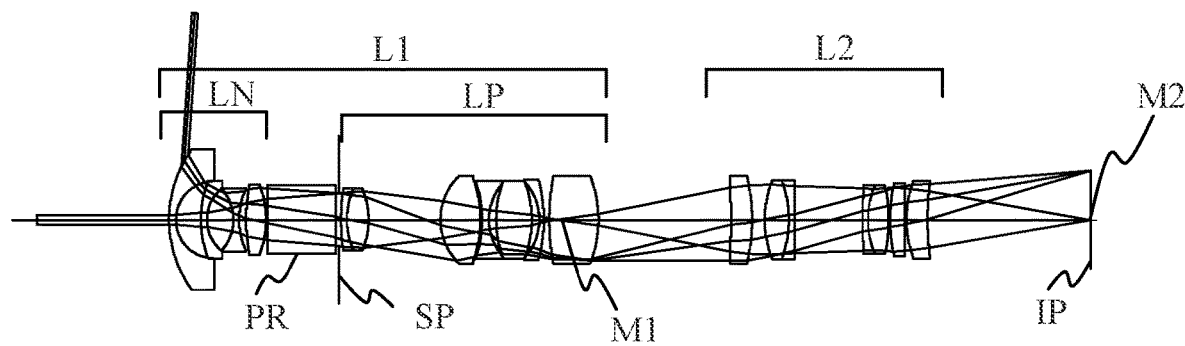
FIG. 1 is an optical path diagram of an optical system according to Example 1.
Figure 2:
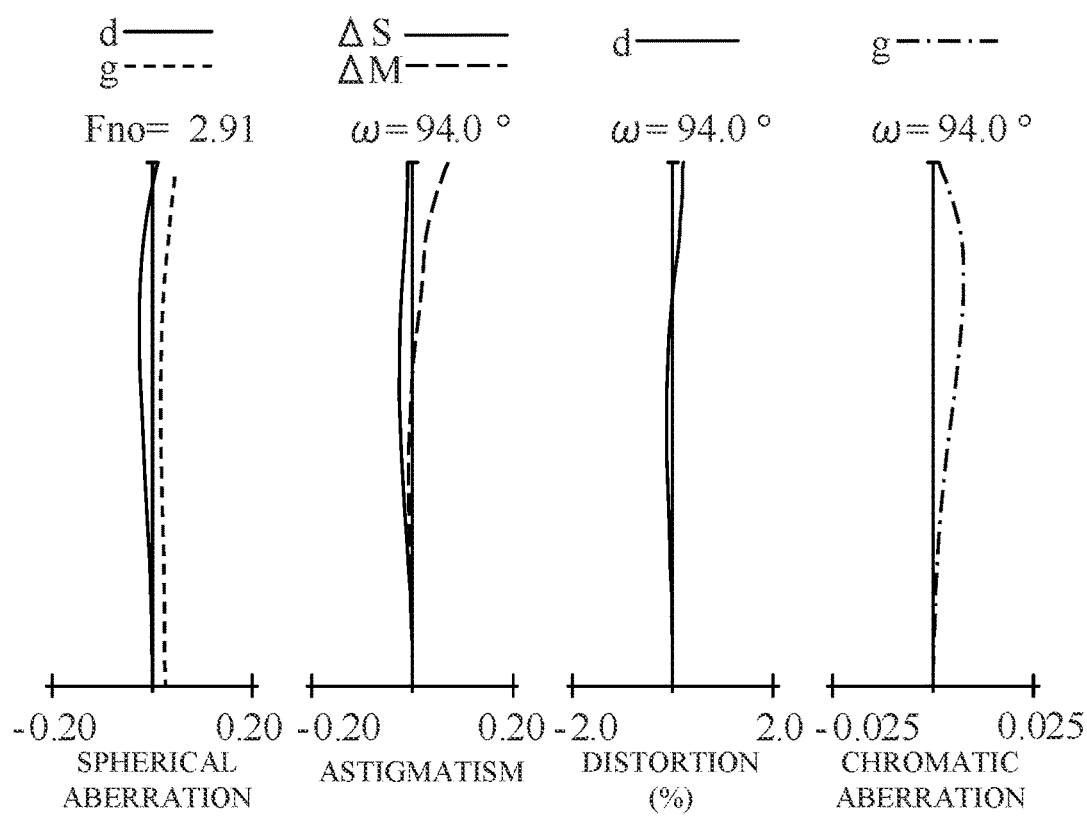
FIG. 2 is a longitudinal aberration diagram of the optical system according to Example 1 in an in-focus state at infinity.
Figure 3:
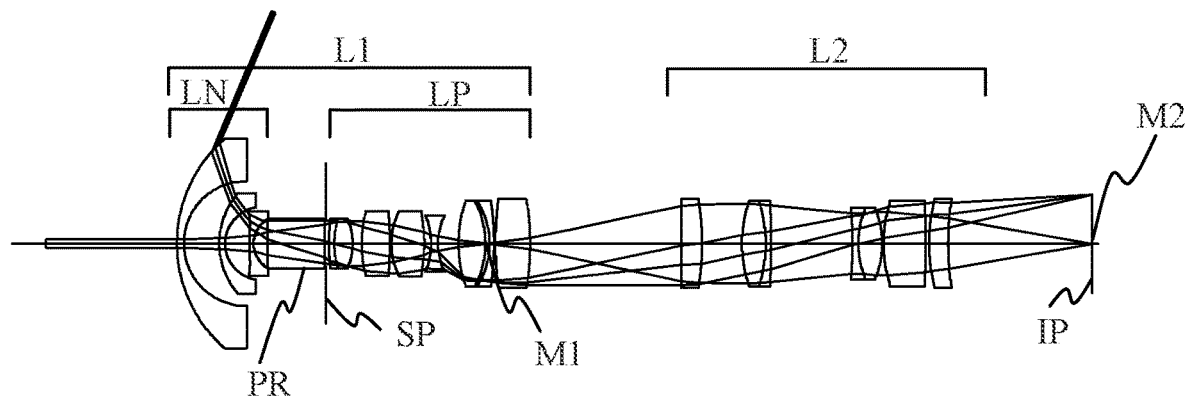
FIG. 3 is an optical path diagram of an optical system according to Example 2.
Figure 4:
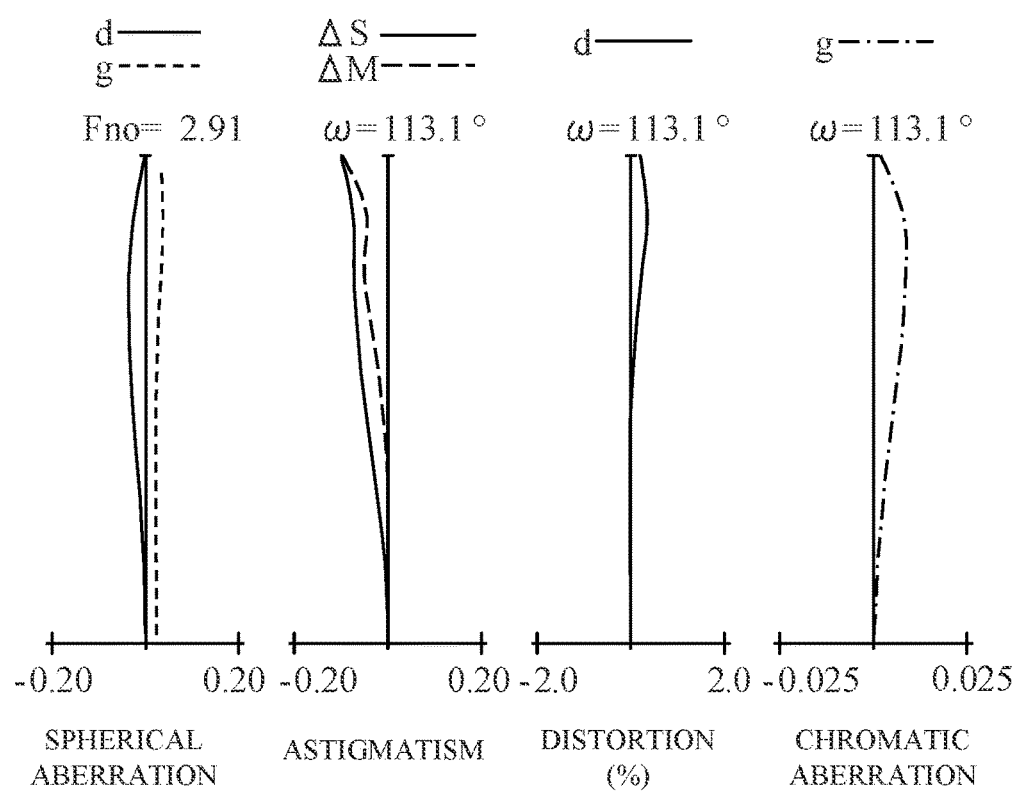
FIG. 4 is a longitudinal aberration diagram of the optical system according to Example 2 in an in-focus state at infinity.
Figure 5:
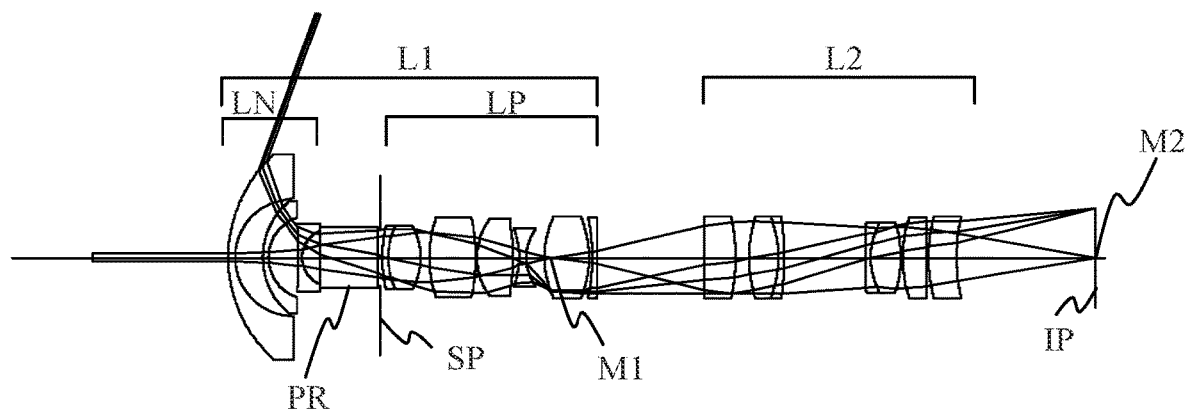
FIG. 5 is an optical path diagram of an optical system according to Example 3.
Figure 6:
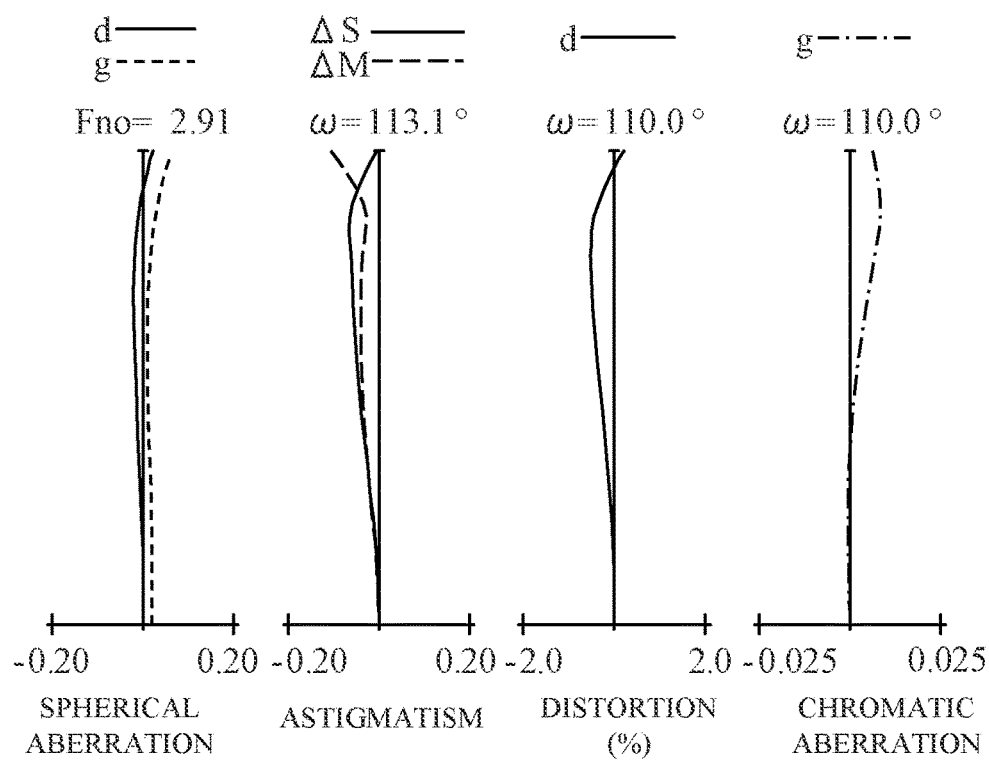
FIG. 6 is a longitudinal aberration diagram of the optical system according to Example 3 in an in-focus state at infinity.
Figure 7:
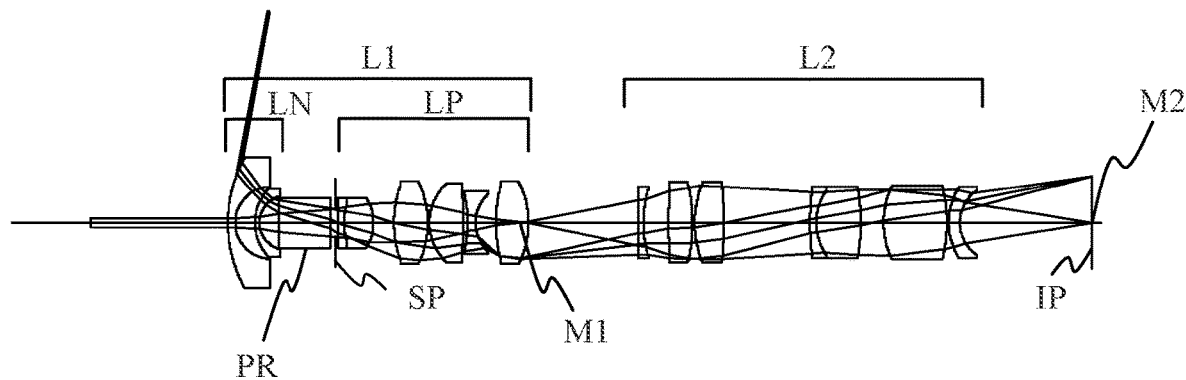
FIG. 7 is an optical path diagram of an optical system according to Example 4.
Figure 8:
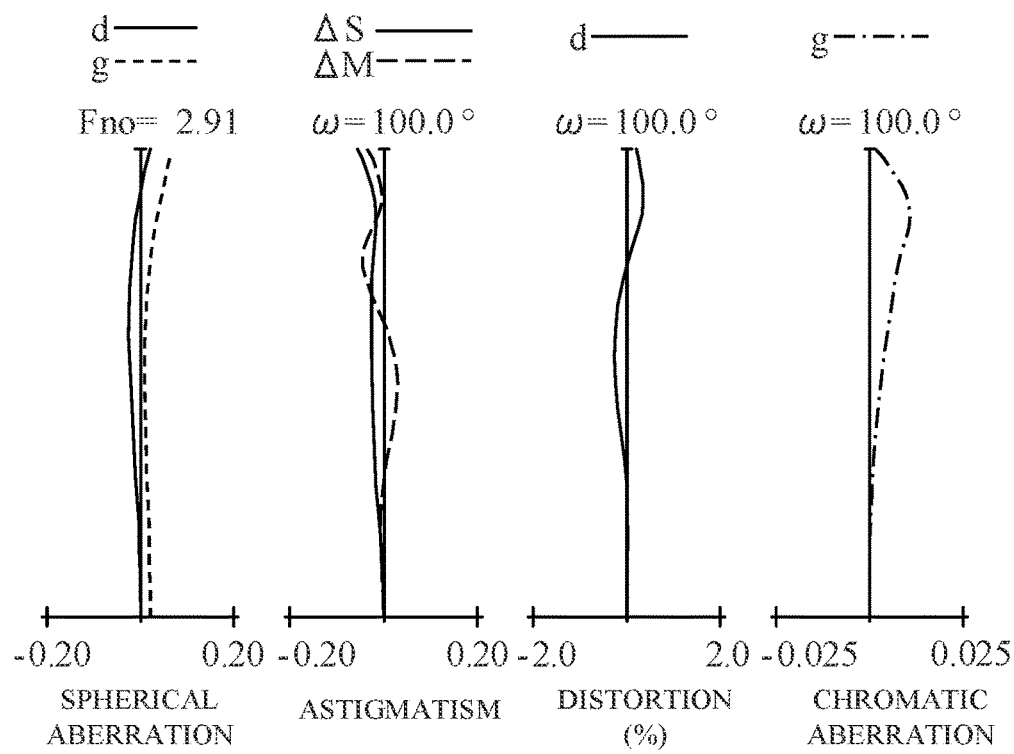
FIG. 8 is a longitudinal aberration diagram of the optical system according to Example 4 in an in-focus state at infinity.

Referring now to the accompanying drawings, a detailed description will be given of embodiments according to the disclosure. Corresponding elements in respective figures will be designated by the same reference numerals, and a duplicate description thereof will be omitted.

FIGS. 1, 3, 5 and 7 are optical path diagrams of optical systems according to Examples 1 to 4, respectively. The optical system according to each example includes a reflective optical element PR having one reflective surface that folds the optical path. In each figure, the optical path is actually bent once, but the optical path diagram is illustrated with the reflective surface unfolded. The optical system according to each example is used in an image pickup apparatus such as a digital video camera, a digital still camera, a broadcast camera, a film-based camera, and a surveillance camera. In each example, the reflective optical element PR is a prism, but may be a mirror.

In each figure, a left side is an object side and a right side is an image side. The optical system according to each example includes a plurality of lens units. The lens unit may include one or more lenses. The lens unit may include an aperture stop.

SP denotes the aperture stop. IP denotes an image plane. In a case where the optical system according to each example is used as an imaging optical system of a digital still camera or a digital video camera, an imaging plane of a solid image sensor (photoelectric conversion element) such as a CCD sensor or a CMOS sensor is placed on the image plane IP. In a case where the optical system according to each example is used as an imaging optical system for a film-based camera, a photosensitive surface corresponding to the film surface is placed on the image plane IP.

FIGS. 2, 4, 6, and 8 are longitudinal aberration diagrams of the optical systems according to Examples 1 to 4 in in-focus states at infinity, respectively. In a spherical aberration diagram, Fno denotes an F-number. The spherical aberration diagram illustrates spherical aberration amounts for the d-line (wavelength 587.6 nm) and g-line (wavelength 435.8 nm). In an astigmatism diagram, $\Delta S$ indicates an astigmatism amount on a sagittal image plane, and $\Delta M$ indicates an astigmatism amount on a meridional image plane. A distortion diagram illustrates a distortion amount for the d-line. A chromatic aberration diagram illustrates a chromatic aberration amount for the g-line. $\omega$ denotes a half angle of view)(°).

A description will now be given of the characteristic configuration of the optical system according to each example.

Figure 9A:
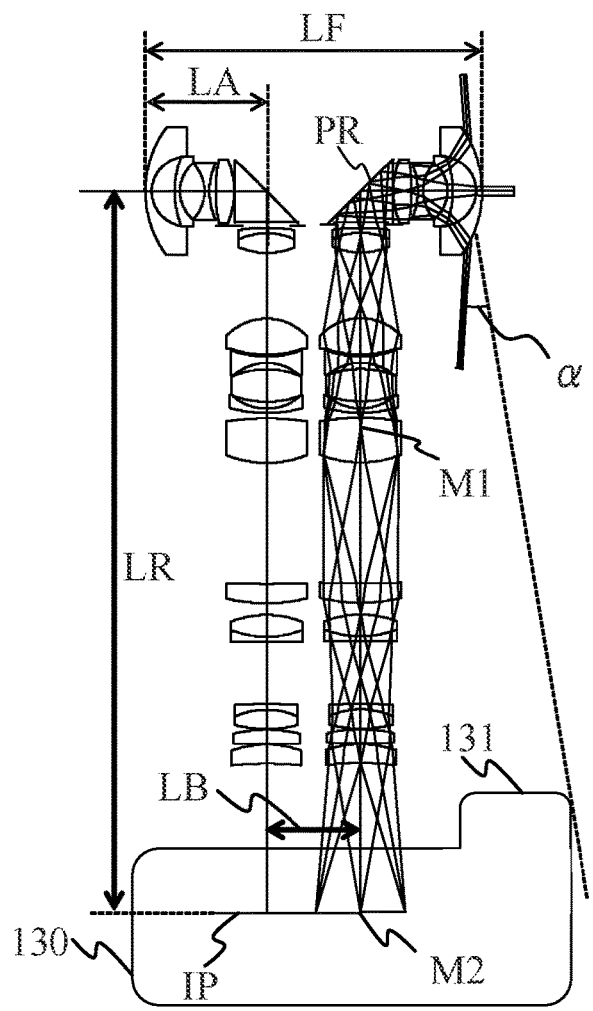
FIGS. 9A and 9B explain a lens apparatus.
Figure 9B:
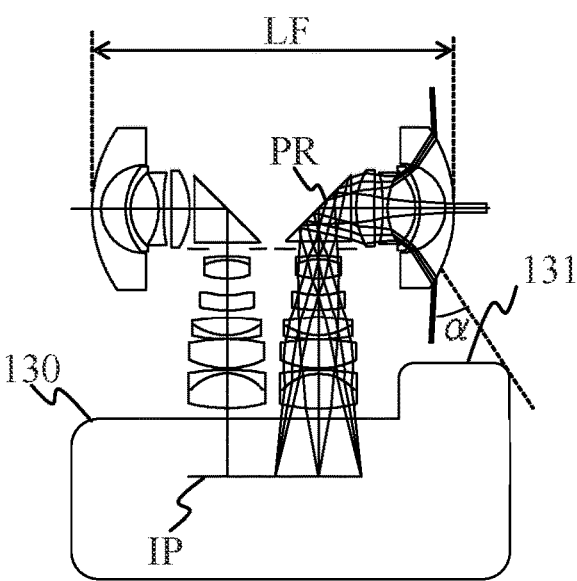

FIG. 9A is an explanatory diagram of a lens apparatus having two optical systems (first optical system and second optical system) according to Example 1 according to this example. FIG. 9B illustrates a lens apparatus having two optical systems according to a comparative example illustrated in FIG. 12. In FIGS. 9A and 9B, the two optical systems are held by unillustrated members. The lens apparatus according to this example includes two optical systems according to Example 1, but may include two optical systems according to another example.

Each of the lens apparatuses in FIGS. 9A and 9B is attached to a camera body 130 having a single image sensor located on the image plane IP. Each of the lens apparatuses in FIGS. 9A and 9B may be configured to be fixed to the camera body 130, or may be configured as an interchangeable lens apparatus. The camera body 130 may have a camera grip 131.

The optical system according to Example 1 has an angle of view wider than 180°. As illustrated in FIG. 9A, the two optical systems are arranged so that their optical axes are located on the same plane (the paper plane). In this example, in order to obtain an omnidirectional image, the two optical systems are arranged so that the optical axes are opposite to each other, or an optical axis direction (first direction) on the object side of one optical system and an optical axis direction (third direction) on the object side of the other optical system are opposite to each other. The single image sensor can capture images formed because the reflective optical elements (first reflective optical element, second reflective optical element) PR provided to the two optical systems bend the optical axes of the two optical systems in the same directions (second direction). The same directions are not limited to parallel directions and include directions toward the same side (for example, directions toward the image sensor). An omnidirectional image can be generated by processing (stitching processing) of stitching captured images acquired by two optical systems whose optical axes on the object side are in opposite directions.

In a case where the stitching processing is performed for captured images acquired by two optical systems to generate an omnidirectional image, a distance between the entrance pupils of the two optical systems may be shortened. As the distance between the entrance pupils increases, captured images are not correctly stitched because parallax occurs in a short-distance object in an image area where two captured images are stitched together.

The optical system according to each example satisfies the following inequality (1):

$$180° < 2\omega < 270° \quad (1)$$

where $\omega$ is a half angle of view (°) of the optical system according to each example.

In a case where the value of $2\omega$ becomes lower than the lower limit of inequality (1), a 360° image (omnidirectional image) cannot be obtained even if the captured images obtained by the two optical systems are stitched. In a case where the value of $2\omega$ becomes higher than the upper limit of inequality (1), the outer diameter of the lens disposed on the object side increases, the distance between the entrance pupils of the two optical systems increases, and the stitching processing accuracy lowers.

Inequality (1) may be replaced with inequality (1a) below:

$$182° < 2\omega < 250° \quad (1a)$$

Inequality (1) may be replaced with inequality (1b) below:

$$185° < 2\omega < 230° \quad (1b)$$

An intermediate imaging point M1 and an image point M2 are formed by each of the first optical system and the second optical system. In the lens apparatus according to this example, the image sensor is disposed at the image point M2, and the image sensor captures images formed by two optical systems.

Figure 12:
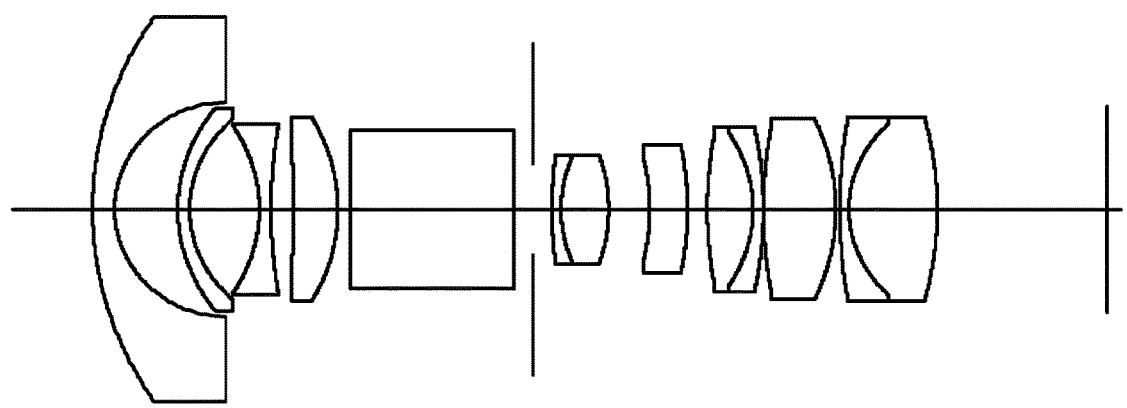
FIG. 12 is a sectional view of an optical system according to a comparative example.

The optical system according to a comparative example in FIG. 12 is a general fisheye lens. No intermediate imaging point M1 is formed by this fisheye lens and the image point M2 is formed by this fisheye lens. In the lens apparatus having the optical system that has no intermediate imaging point M1, an object-side incident surface of the optical system and the camera body 130 or camera grip 131 are disposed close to each other, as illustrated in FIG. 9B. Therefore, even if the angle of view of the optical system is 180° or more, a reflection angle of view $\alpha$ of the camera body 130 or the camera grip 131 becomes wide, and the angle of view for an omnidirectional image is limited.

The optical system according to each example has the intermediate imaging point M1 and the image point M2, and has a long optical total length. Thereby, the distance between the object-side incident surface of the optical system and the camera body 130 or the camera grip 131 can be increased, and the reflection angle of view $\alpha$ of which the camera body 130 or the camera grip 131 can be reduced.

The above configuration can provide a lens apparatus and an image pickup apparatus having the same, each of which can an image with a wide angle of view and reduce the image processing load after imaging.

A description will now be given of the configuration that may be satisfied in the optical system according to each example.

In the optical system according to each example, LM is a maximum air gap located on the image side of the intermediate imaging point M1 and on the object side of a point where the principal ray of the outermost off-axis ray intersects the optical axis. In a case where the point where the principal ray of the outermost off-axis ray intersects the optical axis on the image side of the intermediate imaging point M1 is the air gap, this portion is excluded from the maximum air gap. Where a first partial system L1 is an optical system located on the object side of the maximum air gap LM and a second partial system L2 is an optical system located on the image side of the maximum air gap LM, the reflective optical element PR is located in the first partial system L1. The distance between the entrance pupils of the two optical systems can be shortened, and the stitching processing accuracy can be improved by providing the reflective surface inside the first partial system L1.

In the optical system according to each example, the first partial system L1 is disposed on the object side of the intermediate imaging point M1, and the second partial system L2 is disposed on the image side of the intermediate imaging point M1. The first partial system L1 includes a lens unit (first lens unit) LN having negative refractive power disposed on the object side of the reflective optical element PR, and a lens unit (second lens unit) LP having positive refractive power disposed on the image side of the reflective optical element PR.

The optical system according to each example reduces the diameter of the front lens forming two imaging points of the on-axis light beam. By setting the magnification of the second partial system L2 to be larger than 1:1, the image height of the off-axis ray at the intermediate imaging point M1 can be made smaller than the image height of the off-axis ray at the image point M2. Thereby, the first partial system L1 can be an optical system with an image circle smaller than that on the image sensor, and the size of the first partial system L1 can be reduced. By reducing the size of the first partial system L1, the distance between the entrance pupils of the two optical systems can be shortened, and the stitching processing accuracy can be improved.

A description will now be given of the conditions that the optical system according to each example may satisfy. The optical system according to each example may satisfy one or more of the following inequalities (2) to (9):

| | |
|---|---|
| $-1.60 < \beta L2 < -1.02$ | (2) |
| $0.55 < LA/LB < 1.45$ | (3) |
| $0.20 < LB/LF < 0.52$ | (4) |
| $0.06 < LA/LR < 0.23$ | (5) |
| $-1.10 < fL1/f < -0.55$ | (6) |
| $-7.50 < fL2/f < -3.90$ | (7) |
| $0.50 < fLN/f < 1.55$ | (8) |
| $-7.50 < fLP/f < -2.70$ | (9) |

Here, $\beta L2$ is lateral magnification of the second partial system $\beta L2$. LA is a distance on the optical axis from a lens surface on the object side of a lens disposed closest to the object of the optical system to a reflective surface of the reflective optical element PR. LB is a distance between the optical axes (on the image side of the reflective optical element PR) after the reflective surface (before the image point) of the two optical systems. LF is a distance between vertices of the lens surfaces on the object side of the lenses disposed closest to the object of the two optical systems. LR is a distance on the optical axis from the reflective surface of the reflective optical element PR to the image point M2. f is a focal length of the optical system. fL1 is a combined focal length of the first partial system L1. fL2 is a combined focal length of the second partial system L2. fLN is a combined focal length of lenses disposed on the object side of the reflective optical element PR in the first partial system L1. fLP is a combined focal length of lenses disposed on the image side of the reflective optical element PR in the first partial system L1.

Inequality (2) is an inequality for properly setting a distance between the entrance pupils of the two optical systems for the miniaturization of the first partial system L1. In a case where the value of $\beta L2$ becomes lower than the lower limit of inequality (2), the second partial system L2 disposed close to the image sensor becomes large, and the two optical systems interfere with each other. In a case where the value of $\beta L2$ becomes higher than the upper limit of inequality (2), the size of the first partial system L1 cannot be reduced, the diameter of the front lens increases, the distance between the entrance pupils of the two optical systems increases, and the stitching processing accuracy lowers.

Inequalities (3) to (5) are inequalities for improving the stitching processing accuracy and reducing the camera reflection. In a case where the values become lower than the lower limits of inequalities (3) to (5), the incident surface of the optical system and the reflective surface become too close, so the reflection angle of view α of the camera illustrated in FIG. 10A increases, and an unusable area of a captured image becomes large. In a case where the values become higher than the upper limits of inequalities (3) to (5), the distance increases between the entrance pupils of the two optical systems, and the stitching processing accuracy lowers.

Inequality (6) is an inequality for obtaining the angle of view necessary to generate high image quality and an omnidirectional image. In a case where the value of fL1/f becomes lower than the lower limit of inequality (6), it becomes difficult to obtain the angle of view necessary for stitching processing. In a case where the value of fL1/f becomes higher than the upper limit of inequality (6), the optical system has an angle of view that is unnecessarily wider than the angle of view required for stitching processing, the number of pixels per unit angle of view of the captured image is reduced, and the sense of resolution in viewing the image is reduced.

Inequality (7) is an inequality relating to high image quality. In a case where the value of fL2/f becomes lower than the lower limit value of the inequality (7), the overall length of the second partial system L2 becomes too long, and the operability during imaging deteriorates. In a case where the value of fL2/f becomes higher than the upper limit of inequality (7), aberrations, particularly spherical aberration and coma, generated in the second partial system L2 deteriorate. The overall length of the second partial system L2 is shortened, and the reflection of the camera becomes large.

Inequality (8) is an inequality for properly arranging the distance between the entrance pupils of the two optical systems. In a case where the value of fLN/f becomes lower than the lower limit of inequality (8), the refractive power of the lens unit LN having negative refractive power becomes too strong, and the number of lenses for correcting aberration increases. As a result, the distance between the entrance pupils of the two optical systems increases, and the stitching processing accuracy lowers. In a case where the value of fLN/f becomes higher than the upper limit of inequality (8), the refractive power of the lens unit LN becomes too weak, and the diameter of the front lens increases. As a result, the distance between the entrance pupils of the two optical systems increases, and the stitching processing accuracy lowers.

Inequality (9) is an inequality for preventing interference between two optical systems arranged in parallel. In a case where the value of fLP/f becomes lower than the lower limit of inequality (9), the refractive power of the lens unit LP becomes too weak, so that the lens unit LP becomes large and interference with adjacent lenses poses a problem. In a case where the value of fLP/f becomes higher than the upper limit of the inequality (9), the refractive power of the lens unit LP becomes too strong, on-axis and off-axis aberrations significantly occur, and it becomes difficult to achieve high image quality.

Inequalities (2) to (9) may be replaced with the following inequalities (2a) to (9a):

| | |
|---|---|
| $-1.50 < \beta L2 < -1.07$ | (2a) |
| $0.60 < LA/LB < 1.37$ | (3a) |
| $0.23 < LB/LF < 0.48$ | (4a) |
| $0.07 < LA/LR < 0.21$ | (5a) |
| $-0.97 < fL1/f < -0.62$ | (6a) |
| $-7.30 < fL2/f < -4.10$ | (7a) |
| $0.60 < fLN/f < 1.45$ | (8a) |
| $-7.00 < fLP/f < -2.90$ | (9a) |

Inequalities (2) to (9) may be replaced with the following inequalities (2b) to (9b):

| | |
|---|---|
| $-1.40 < \beta L2 < -1.10$ | (2b) |
| $0.65 < LA/LB < 1.30$ | (3b) |
| $0.26 < LB/LF < 0.45$ | (4b) |
| $0.08 < LA/LR < 0.19$ | (5b) |
| $-0.90 < fL1/f < -0.70$ | (6b) |
| $-7.10 < fL2/f < -4.30$ | (7b) |
| $0.70 < fLN/f < 1.35$ | (8b) |
| $-6.50 < fLP/f < -3.10$ | (9b) |

Figure 10:
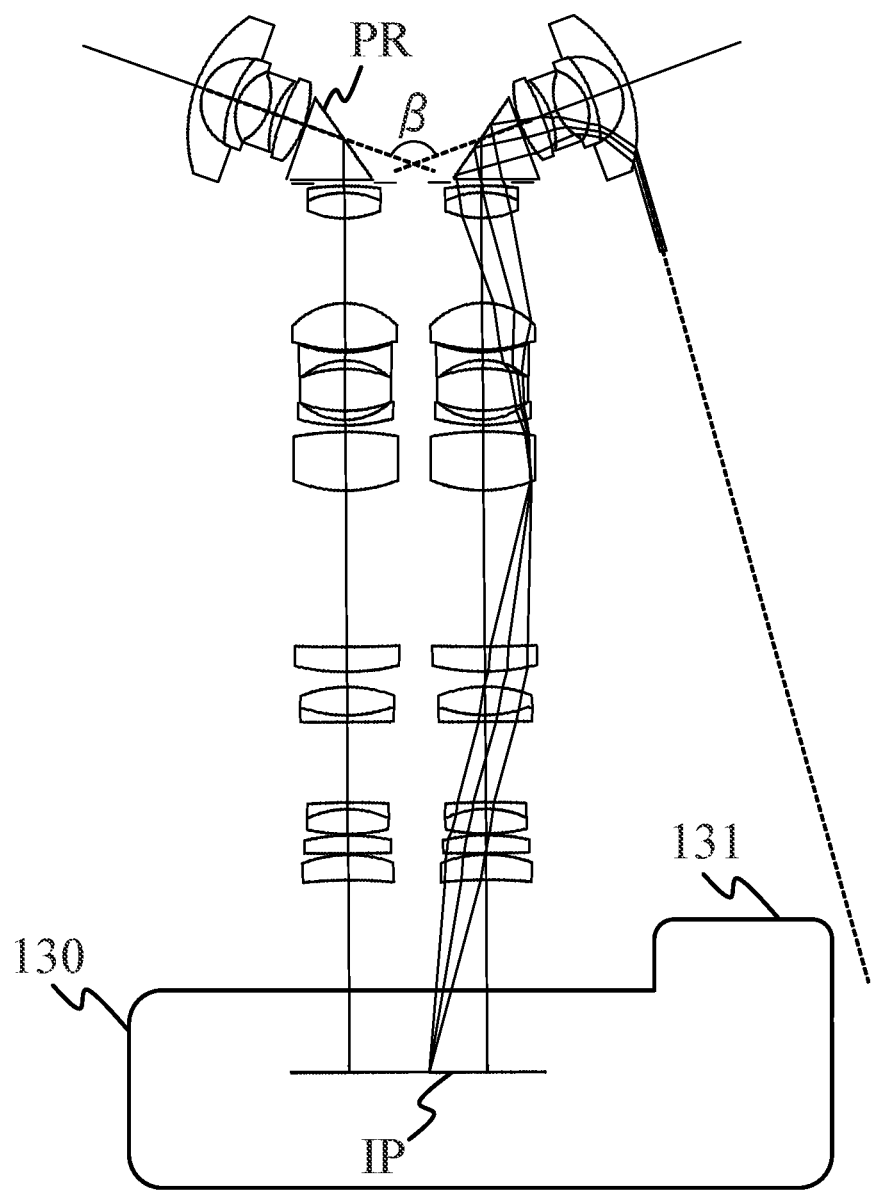
FIG. 10 explains an angle formed by optical axes on the object side of the two optical systems.

In FIG. 9A, the bending of the optical path by the reflective optical element PR is illustrated at 90°. However, the bending angle does not have to be 90°. As illustrated in FIG. 10, β, which is an angle formed by the optical axes of the two optical systems on the object side may be set, for example, as β<180° so that the grip is not captured in the image.

The angle β formed by the object-side optical axes of the two optical systems may be set within the following range.

$$150°<\beta<190° \quad (10)$$

In a case where the value of β becomes lower than the lower limit of inequality (10), the image will be largely missing. In a case where the value of β becomes higher than the upper limit of the inequality (10), the reflection of the camera becomes significant.

A detailed description will be given of the optical system L0 according to each example.

In Example 1, the lens unit LN consists of, in order from the object side to the image side, a negative meniscus lens with a lens surface that is convex on the object side, a negative meniscus lens with a lens surface that is convex on the object side, a biconcave lens, and a biconvex lens. The lens unit LP consists of, in order from the object side to the image side, a cemented lens of a negative meniscus lens with a lens surface that is concave on the object side and a biconvex lens, a biconvex lens, a biconcave lens, a biconvex lens, a negative meniscus lens with a lens surface that is convex on the image side, and a biconvex lens. The second partial system L2 consists of, in order from the object side to the image side, a positive meniscus lens with a lens surface that is convex on the image side, a cemented lens of a biconvex lens and a negative meniscus lens with a lens surface that is concave on the object side, a cemented lens of a negative meniscus lens with a lens surface that is concave on the image side and a biconvex lens, a biconvex lens, and a positive meniscus lens with a lens surface that is convex on the object side.

In Example 2, the lens unit LN consists of, in order from the object side to the image side, three negative meniscus lenses with lens surfaces that are convex on the object side. Curvature of field and astigmatism are corrected by setting an aspheric lens surface on the object side of a lens disposed closest to the image plane among negative meniscus lenses included in the lens unit LN. The lens unit LP consists of, in order from the object side to the image side, a cemented lens of a negative meniscus lens with a lens surface that is convex on the object side and a biconvex lens, a biconvex lens, a biconvex lens, a biconcave lens, a biconvex lens, a negative meniscus lens with a lens surface that is concave on the object side, and a biconvex lens. The second partial system L2 includes, in order from the object side to the image side, a biconvex lens, a cemented lens of a biconvex lens and a negative meniscus lens with a lens surface that is concave on the object side, a cemented lens of a biconcave lens and a biconvex lens, a biconvex lens, and a positive meniscus lens with a lens surface that is convex on the object side.

In Example 3, the lens unit LN consists of, in order from the object side to the image side, three negative meniscus lenses with lens surfaces that are convex on the object side. Curvature of field and astigmatism are corrected by setting an aspheric lens surface on the object side of a lens closest to the image plane among negative meniscus lenses included in the lens unit LN. The lens unit LP consists of, in order from the object side to the image side, a cemented lens of a negative meniscus lens with a lens surface that is convex on the object side and a biconvex lens, a biconvex lens, a biconvex lens, a biconcave lens, a biconvex lens, and a negative meniscus lens with a lens surface that is convex on the image side. The second partial system L2 includes, in order from the object side to the image side, a biconvex lens, a cemented lens of a biconvex lens and a negative meniscus lens with a lens surface that is convex on the image side, a cemented lens of a negative meniscus lens with a lens surface that is convex on the object side and a biconvex lens, a biconvex lens, and a positive meniscus lens with a lens surface that is convex on the object side.

In Example 4, the lens unit LN consists of, in order from the object side to the image side, two negative meniscus lenses with lens surfaces that are convex on the object side. Curvature of field and astigmatism are corrected by setting an aspheric lens surface on the object side of a lens closest to the image plane among negative meniscus lenses included in the lens unit LN. The lens unit LP consists of, in order from the object side to the image side, a cemented lens of a biconcave lens and a biconvex lens, a biconvex lens, a biconvex lens, a biconcave lens, and a biconvex lens. The second partial system L2 includes, in order from the object side to the image side, a biconvex lens, a biconvex lens, a cemented lens of a negative meniscus lens with a lens surface that is convex on the object side and a biconvex lens, a biconvex lens, and a negative meniscus lens with a lens surface that is convex on the object side.

Examples 1 and 2 assume the size of the image sensor to be 36 mm×24 mm, and the distance LB between the optical axes after the reflective surfaces of the two optical systems to be 18.5 mm. Examples 3 and 4 assume the size of the image sensor is assumed to be 22.3 mm× 14.9 mm, and the distance LB between the optical axes of the two optical systems after the reflective surfaces to be 11.40 mm.

Numerical examples 1 to 4 corresponding to Examples 1 to 4 and the comparative example will be illustrated below.

In surface data of each numerical example, r represents a radius of curvature of each optical surface, and d (mm) represents an on-axis distance (distance on the optical axis) between an m-th surface and an (m+1)-th surface, where m is a surface number counted from the light incident side. nd represents a refractive index of each optical element for the d-line, and νd represents an Abbe number of the optical member. The Abbe number νd of a certain material is expressed as follows:

$$\nu d=(Nd-1)/(NF-NC)$$

where Nd, NF, and NC are refractive indices based on the d-line (587.6 nm), the F-line (486.1 nm), and the C-line (656.3 nm) in the Fraunhofer line, respectively.

In each numerical example, values of d, a focal length (mm), an F-number, and a half angle of view)(°) are set in a case where the optical system according to each example is in an in-focus state on an infinity object. A "back focus" is a distance on the optical axis from the final lens surface (lens surface closest to the image plane) to the paraxial image plane expressed in air conversion length. An "overall lens length" is a length obtained by adding the back focus to a distance on the optical axis from the first lens surface (lens surface closest to the object) of the optical system L0 to the final lens surface.

In a case where the optical surface is aspherical, an asterisk * is attached to the right side of the surface number. The aspherical shape is expressed as follows:

$$X=(h^2/R)/[1+\{1-(1+K)(h/R)^2\}^{1/2}]+A4 \times h^4+A6 \times h^6+ A8 \times h^8+A10 \times h^{10}+A12 \times h^{12}+A14 \times h^{14}$$

where X is a displacement amount from a surface vertex in the optical axis direction, h is a height from the optical axis in a direction orthogonal to the optical axis, a light traveling direction is set positive, R is a paraxial radius of curvature, K is a conic constant, and A4, A6, A8, A10, A12, and A14 are aspherical coefficients. "e±XX" in each aspheric coefficient means "×10$^{\pm XX}$."

Numerical Example 1

UNIT: mm

SURFACE DATA

| Surface No | r | d | nd | vd | Effective Diameter |
|---|---|---|---|---|---|
| 1 | 20.827 | 1.20 | 2.00069 | 25.5 | 22.72 |
| 2 | 6.712 | 4.39 | | | 13.02 |
| 3 | 18.337 | 1.00 | 1.80810 | 22.8 | 12.38 |
| 4 | 7.051 | 4.66 | | | 9.99 |
| 5 | −7.891 | 1.00 | 1.59522 | 67.7 | 9.27 |
| 6 | 13.103 | 1.20 | | | 9.90 |
| 7 | 32.327 | 3.48 | 2.00100 | 29.1 | 10.52 |
| 8 | −15.953 | 0.20 | | | 11.03 |
| 9 | ∞ | 12.00 | 1.88300 | 40.8 | 10.74 |
| 10 | ∞ | 0.50 | | | 9.21 |
| 11(aperture stop) | ∞ | 0.50 | | | 9.20 |
| 12 | 40.114 | 1.00 | 1.73800 | 32.3 | 9.42 |
| 13 | 13.261 | 3.75 | 1.59522 | 67.7 | 9.52 |
| 14 | −13.765 | 12.54 | | | 9.79 |
| 15 | 10.566 | 6.92 | 1.59522 | 67.7 | 14.30 |
| 16 | −21.744 | 0.34 | | | 12.86 |
| 17 | −19.126 | 1.20 | 1.85478 | 24.8 | 12.48 |
| 18 | 9.629 | 1.24 | | | 11.45 |
| 19 | 18.202 | 6.18 | 2.00100 | 29.1 | 11.83 |
| 20 | −18.793 | 1.34 | | | 12.24 |
| 21 | −9.726 | 0.80 | 1.73800 | 32.3 | 12.11 |
| 22 | −26.088 | 0.96 | | | 12.92 |
| 23 | 43.841 | 8.66 | 1.72916 | 54.7 | 14.29 |
| 24 | −20.507 | 23.06 | | | 14.30 |
| 25 | −206.735 | 3.67 | 2.00069 | 25.5 | 14.20 |
| 26 | −32.407 | 2.23 | | | 14.30 |
| 27 | 18.439 | 4.18 | 1.43875 | 94.7 | 12.62 |
| 28 | −19.222 | 1.00 | 1.66565 | 35.6 | 11.80 |
| 29 | −1197.331 | 11.87 | | | 11.71 |
| 30 | 95.703 | 1.00 | 2.00100 | 29.1 | 10.75 |
| 31 | 14.354 | 3.65 | 1.43875 | 94.7 | 10.57 |
| 32 | −26.746 | 0.20 | | | 10.94 |
| 33 | 27.807 | 2.67 | 1.48749 | 70.2 | 11.03 |
| 34 | −292.388 | 0.20 | | | 11.64 |
| 35 | 19.161 | 3.72 | 1.48749 | 70.2 | 12.17 |
| 36 | 63.905 | 28.40 | | | 12.32 |
| Image Plane | ∞ | | | | |

VARIOUS DATA

| | |
|---|---|
| Focal Length | −5.20 |
| Fno. | 2.91 |
| Half Angle of View (°) | 94.01 |
| Image Height | 8.55 |
| Overall Lens Length | 160.93 |
| BF | 28.40 |

| | |
|---|---|
| Entrance Pupil Position | 6.32 |
| Exit Pupil Position | −23.55 |
| Front Principal Point Position | 0.60 |
| Rear Principal Point Position | 33.60 |

Lens Unit Data

| Lens Unit | Starting Surface | End Surface | Focal Length | Lens Structure Length |
|---|---|---|---|---|
| L1 | 1 | 24 | 4.44 | 75.06 |
| L2 | 25 | 36 | 23.83 | 34.40 |
| LN | 1 | 8 | −6.59 | 16.93 |
| LP | 12 | 24 | 32.72 | 44.93 |

Lens Unit Data

| Lens Unit | Front Principal Point Position | Rear Principal Point Position |
|---|---|---|
| L1 | 11.20 | −7.52 |
| L2 | 18.02 | −23.35 |
| LN | 1.06 | −18.73 |
| LP | 48.95 | −57.82 |

Fixed Focal Lens Data

| Lens | Starting Surface | Focal Length |
|---|---|---|
| 1 | 1 | −10.34 |
| 2 | 3 | −14.76 |
| 3 | 5 | −8.13 |
| 4 | 7 | 11.07 |
| 5 | 9 | 0.00 |
| 6 | 12 | −27.27 |
| 7 | 13 | 11.97 |
| 8 | 15 | 12.98 |
| 9 | 17 | −7.35 |
| 10 | 19 | 10.08 |
| 11 | 21 | −21.46 |
| 12 | 23 | 20.32 |
| 13 | 25 | 38.00 |
| 14 | 27 | 22.20 |
| 15 | 28 | −29.36 |
| 16 | 30 | −16.97 |
| 17 | 31 | 21.88 |
| 18 | 33 | 52.23 |
| 19 | 35 | 54.65 |

Numerical Example 2

UNIT: mm

SURFACE DATA

| Surface No | r | d | nd | vd | Effective Diameter |
|---|---|---|---|---|---|
| 1 | 24.141 | 1.20 | 2.00069 | 25.5 | 34.81 |
| 2 | 10.869 | 6.18 | | | 21.09 |
| 3 | 13.527 | 1.00 | 1.80810 | 22.8 | 16.58 |
| 4 | 6.393 | 4.23 | | | 11.49 |
| 5* | 23.297 | 0.70 | 1.58313 | 59.4 | 10.08 |
| 6 | 4.827 | 2.48 | | | 7.79 |
| 7 | ∞ | 10.00 | 1.88300 | 40.8 | 7.80 |
| 8 | ∞ | 0.20 | | | 7.83 |
| 9(aperture stop) | ∞ | 0.50 | | | 7.84 |
| 10 | 25.867 | 1.00 | 1.85478 | 24.8 | 7.84 |
| 11 | 17.257 | 3.16 | 1.59522 | 67.7 | 7.69 |
| 12 | −10.197 | 1.56 | | | 7.88 |
| 13 | 21.254 | 4.94 | 1.59522 | 67.7 | 9.50 |
| 14 | −54.738 | 0.20 | | | 10.16 |
| 15 | 12.169 | 5.73 | 1.59522 | 67.7 | 10.38 |
| 16 | −29.178 | 1.19 | | | 9.29 |
| 17 | −12.705 | 1.20 | 1.85478 | 24.8 | 8.79 |

-continued

SURFACE DATA

| Surface No | r | d | nd | vd | Effective Diameter |
|---|---|---|---|---|---|
| 18 | 10.564 | 3.54 | | | 8.87 |
| 19 | 21.210 | 4.69 | 2.00100 | 29.1 | 13.38 |
| 20 | −16.249 | 0.77 | | | 13.79 |
| 21 | −13.498 | 0.80 | 1.73800 | 32.3 | 13.50 |
| 22 | −42.853 | 0.20 | | | 13.97 |
| 23 | 57.926 | 6.02 | 1.72916 | 54.7 | 14.30 |
| 24 | −44.752 | 26.32 | | | 14.30 |
| 25 | 323.471 | 3.72 | 2.00069 | 25.5 | 14.30 |
| 26 | −40.326 | 6.86 | | | 14.23 |
| 27 | 22.451 | 4.10 | 1.43875 | 94.7 | 13.87 |
| 28 | −24.522 | 1.00 | 1.66565 | 35.6 | 13.50 |
| 29 | −106.180 | 14.11 | | | 13.38 |
| 30 | −58.410 | 1.00 | 1.90366 | 31.3 | 10.46 |
| 31 | 14.624 | 4.30 | 1.43875 | 94.7 | 10.41 |
| 32 | −15.607 | 0.20 | | | 11.56 |
| 33 | 22.815 | 7.33 | 1.48749 | 70.2 | 12.88 |
| 34 | −129.473 | 0.61 | | | 13.97 |
| 35 | 31.689 | 3.32 | 1.48749 | 70.2 | 14.30 |
| 36 | 51.175 | 24.98 | | | 14.26 |
| Image Plane | ∞ | | | | |

Aspheric Data

5th Surface

K=0.00000e+00 A 4=−9.73252e−04 A 6=−2.35587e−06 A 8=2.89929e−07 A10=−1.39245e−09

VARIOUS DATA

| | |
|---|---|
| Focal Length | −4.32 |
| Fno. | 2.91 |
| Half Angle of View (°) | 113.09 |
| Image Height | 8.55 |
| Overall Lens Length | 159.32 |
| BF | 24.98 |

| | |
|---|---|
| Entrance Pupil Position | 8.92 |
| Exit Pupil Position | −14.81 |
| Front Principal Point Position | 4.12 |
| Rear Principal Point Position | 29.30 |

Lens Unit Data

| Lens Unit | Starting Surface | End Surface | Focal Length | Lens Structure Length |
|---|---|---|---|---|
| L1 | 1 | 24 | 3.71 | 61.48 |
| L2 | 25 | 36 | 29.90 | 46.54 |
| LN | 1 | 6 | −3.23 | 13.30 |
| LP | 10 | 24 | 17.60 | 35.50 |

Lens Unit Data

| Lens Unit | Front Principal Point Position | Rear Principal Point Position |
|---|---|---|
| L1 | 12.69 | −7.85 |
| L2 | 25.08 | −39.78 |
| LN | 6.43 | −2.75 |
| LP | 18.46 | −41.95 |

Fixed Focal Lens Data

| Lens | Starting Surface | Focal Length |
|---|---|---|
| 1 | 1 | −20.69 |
| 2 | 3 | −16.00 |
| 3 | 5 | −10.59 |
| 4 | 7 | 0.00 |
| 5 | 10 | −64.08 |
| 6 | 11 | 11.25 |
| 7 | 13 | 26.36 |
| 8 | 15 | 15.21 |
| 9 | 17 | −6.59 |
| 10 | 19 | 9.80 |
| 11 | 21 | −27.01 |
| 12 | 23 | 35.50 |
| 13 | 25 | 36.02 |
| 14 | 27 | 27.44 |
| 15 | 28 | −48.14 |
| 16 | 30 | −12.86 |
| 17 | 31 | 17.99 |
| 18 | 33 | 40.43 |
| 19 | 35 | 161.70 |

Numerical Example 3

UNIT: mm

SURFACE DATA

| Surface No | r | d | nd | vd | Effective Diameter |
|---|---|---|---|---|---|
| 1 | 15.242 | 0.76 | 2.00069 | 25.5 | 20.93 |
| 2 | 6.440 | 2.98 | | | 12.50 |
| 3 | 7.884 | 0.63 | 1.80810 | 22.8 | 11.01 |
| 4 | 4.565 | 3.30 | | | 8.21 |
| 5* | 18.508 | 0.44 | 1.58313 | 59.4 | 6.67 |
| 6 | 3.146 | 1.95 | | | 5.18 |
| 7 | ∞ | 6.31 | 1.88300 | 40.8 | 5.30 |
| 8 | ∞ | 0.20 | | | 5.98 |
| 9(aperture stop) | ∞ | 0.32 | | | 6.02 |
| 10 | 16.988 | 0.63 | 1.85478 | 24.8 | 6.14 |
| 11 | 8.205 | 3.53 | 1.59522 | 67.7 | 6.08 |
| 12 | −7.283 | 0.94 | | | 6.21 |
| 13 | 12.557 | 5.08 | 1.59522 | 67.7 | 7.36 |
| 14 | −20.083 | 0.13 | | | 7.70 |
| 15 | 6.975 | 3.94 | 1.59522 | 67.7 | 7.54 |
| 16 | −20.791 | 0.68 | | | 6.18 |
| 17 | −8.574 | 0.76 | 1.85478 | 24.8 | 5.69 |
| 18 | 5.046 | 1.99 | | | 5.35 |
| 19 | 9.918 | 4.95 | 2.00100 | 29.1 | 7.70 |
| 20 | −11.762 | 0.39 | | | 8.00 |
| 21 | −19.009 | 0.51 | 1.73800 | 32.3 | 7.82 |
| 22 | −147.500 | 11.69 | | | 7.85 |
| 23 | 611.726 | 3.39 | 2.00069 | 25.5 | 8.00 |
| 24 | −21.235 | 1.49 | | | 8.00 |
| 25 | 15.513 | 3.19 | 1.43875 | 94.7 | 8.00 |
| 26 | −12.300 | 0.63 | 1.66565 | 35.6 | 7.80 |
| 27 | −35.687 | 8.91 | | | 7.81 |
| 28 | 117.232 | 0.63 | 1.90366 | 31.3 | 6.59 |
| 29 | 8.100 | 3.27 | 1.43875 | 94.7 | 6.46 |
| 30 | −11.698 | 0.20 | | | 6.84 |
| 31 | 13.599 | 2.61 | 1.48749 | 70.2 | 7.53 |
| 32 | −222.090 | 0.20 | | | 7.85 |
| 33 | 17.814 | 3.05 | 1.48749 | 70.2 | 8.00 |
| 34 | 20.063 | 15.15 | | | 7.98 |
| Image Plane | ∞ | | | | |

Aspheric Data

5th Surface

K=0.00000e+00 A 4=−2.93721e−03 A 6=−1.02958e−04 A 8=1.04946e−05 A10=−1.60850e−07

VARIOUS DATA

| | |
|---|---|
| Focal Length | −2.81 |
| Fno. | 2.91 |
| Half Angle of View (°) | 110.00 |
| Image Height | 5.40 |
| Overall Lens Length | 94.83 |
| BF | 15.15 |
| Entrance Pupil Position | 5.39 |
| Exit Pupil Position | −6.07 |
| Front Principal Point Position | 2.22 |
| Rear Principal Point Position | 17.96 |

Lens Unit Data

| Lens Unit | Starting Surface | End Surface | Focal Length | Lens Structure Length |
|---|---|---|---|---|
| L1 | 1 | 22 | 2.08 | 40.41 |
| L2 | 23 | 34 | 15.45 | 27.58 |
| LN | 1 | 6 | −2.19 | 8.12 |
| LP | 10 | 22 | 9.16 | 23.51 |

Lens Unit Data

| Lens Unit | Front Principal Point Position | Rear Principal Point Position |
|---|---|---|
| L1 | 7.48 | −4.49 |
| L2 | 12.78 | −21.14 |
| LN | 3.71 | −1.81 |
| LP | 8.97 | −20.28 |

Fixed Focal Lens Data

| Lens | Starting Surface | Focal Length |
|---|---|---|
| 1 | 1 | −11.64 |
| 2 | 3 | −14.66 |
| 3 | 5 | −6.57 |
| 4 | 7 | 0.00 |
| 5 | 10 | −19.20 |
| 6 | 11 | 7.09 |
| 7 | 13 | 13.78 |
| 8 | 15 | 9.26 |
| 9 | 17 | 3.62 |
| 10 | 19 | 6.07 |
| 11 | 21 | −29.62 |
| 12 | 23 | 20.56 |
| 13 | 25 | 16.20 |
| 14 | 26 | −28.51 |
| 15 | 28 | −9.65 |
| 16 | 29 | 11.49 |
| 17 | 31 | 26.38 |
| 18 | 33 | 225.66 |

Numerical Example 4

UNIT: mm

SURFACE DATA

| Surface No | r | d | nd | vd | Effective Diameter |
|---|---|---|---|---|---|
| 1 | 15.242 | 0.76 | 1.90043 | 37.4 | 13.16 |
| 2 | 4.008 | 2.05 | | | 7.53 |
| 3* | 5.555 | 0.44 | 1.85400 | 40.4 | 6.59 |
| 4 | 3.009 | 2.00 | | | 5.21 |
| 5 | ∞ | 5.50 | 1.88300 | 40.8 | 4.89 |
| 6 | ∞ | 0.43 | | | 3.06 |
| 7(aperture stop) | ∞ | 0.32 | | | 3.06 |
| 8 | −30.167 | 0.63 | 1.85478 | 24.8 | 3.16 |
| 9 | 7.401 | 3.03 | 1.59522 | 67.7 | 3.36 |
| 10 | −5.087 | 2.12 | | | 4.90 |
| 11 | 12.999 | 3.53 | 1.59522 | 67.7 | 7.59 |
| 12 | −10.648 | 0.13 | | | 8.07 |
| 13 | 6.090 | 3.49 | 1.59522 | 67.7 | 7.76 |
| 14 | −108.693 | 0.53 | | | 6.43 |
| 15 | −14.041 | 0.76 | 1.85478 | 24.8 | 6.15 |
| 16 | 4.357 | 2.12 | | | 5.49 |
| 17 | 15.662 | 3.41 | 2.00100 | 29.1 | 7.18 |
| 18 | −9.852 | 11.45 | | | 8.00 |
| 19 | ∞ | 0.51 | 1.73800 | 32.3 | 7.04 |
| 20 | 13.540 | 2.59 | | | 7.00 |
| 21 | 226.286 | 2.48 | 2.00069 | 25.5 | 7.71 |
| 22 | −18.842 | 0.22 | | | 8.00 |
| 23 | 11.937 | 3.04 | 1.43875 | 94.7 | 8.00 |
| 24 | −39.539 | 8.91 | | | 7.94 |
| 25 | 30.955 | 0.63 | 1.90366 | 31.3 | 6.73 |
| 26 | 6.481 | 4.68 | 1.43875 | 94.7 | 6.50 |
| 27 | −18.151 | 2.37 | | | 7.01 |
| 28 | 9.458 | 6.55 | 1.48749 | 70.2 | 7.14 |
| 29 | −18.776 | 0.20 | | | 7.21 |
| 30 | 7.450 | 1.17 | 1.48749 | 70.2 | 7.00 |
| 31 | 4.461 | 13.65 | | | 6.30 |
| Image Plane | ∞ | | | | |

Aspheric Data
3rd Surface
K=0.00000e+000 A 4=4.97833e−004 A 6=−1.19457e−004 A 8=1.99968e−005 A10=−1.14524e−006

VARIOUS DATA

| | |
|---|---|
| Focal Length | −2.86 |
| Fno. | 2.91 |
| Half Angle of View (°) | 100.00 |
| Image Height | 5.00 |
| Overall Lens Length | 89.67 |
| BF | 13.65 |
| Entrance Pupil Position | 3.51 |
| Exit Pupil Position | −16.14 |
| Front Principal Point Position | 0.38 |
| Rear Principal Point Position | 16.51 |

Lens Unit Data

| Lens Unit | Starting Surface | End Surface | Focal Length | Lens Structure Length |
|---|---|---|---|---|
| L1 | 1 | 18 | 2.35 | 31.23 |
| L2 | 19 | 31 | 13.77 | 33.34 |
| LN | 1 | 4 | −3.06 | 3.25 |
| LP | 8 | 18 | 9.07 | 19.74 |

| Lens Unit Data | | |
| --- | --- | --- |
| Lens Unit | Front Principal Point Position | Rear Principal Point Position |
| L1 | 6.07 | −2.32 |
| L2 | 13.64 | −16.91 |
| LN | 1.46 | −0.90 |
| LP | 11.25 | −15.99 |

| Fixed Focal Lens Data | | |
| --- | --- | --- |
| Lens | Starting Surface | Focal Length |
| 1 | 1 | −6.24 |
| 2 | 3 | −8.35 |
| 3 | 5 | 0.00 |
| 4 | 8 | −6.90 |
| 5 | 9 | 5.57 |
| 6 | 11 | 10.41 |
| 7 | 13 | 9.80 |
| 8 | 15 | −3.82 |
| 9 | 17 | 6.47 |
| 10 | 19 | −18.35 |
| 11 | 21 | 17.47 |
| 12 | 23 | 21.28 |
| 13 | 25 | −9.18 |
| 14 | 26 | 11.55 |
| 15 | 28 | 13.96 |
| 16 | 30 | −26.18 |

Comparative Example

UNIT: mm

| SURFACE DATA | | | | | |
| --- | --- | --- | --- | --- | --- |
| Surface No | r | d | nd | vd | Effective Diameter |
| 1 | 28.517 | 1.75 | 2.00100 | 29.1 | 30.19 |
| 2 | 8.890 | 5.00 | | | 17.21 |
| 3 | 13.302 | 0.95 | 1.95375 | 32.3 | 15.75 |
| 4 | 9.773 | 5.55 | | | 13.85 |
| 5 | −12.578 | 0.95 | 1.85400 | 40.4 | 12.80 |
| 6 | 42.227 | 1.71 | | | 13.10 |
| 7 | −768.010 | 3.59 | 2.00100 | 29.1 | 13.64 |
| 8 | −14.928 | 1.00 | | | 14.07 |
| 9 | ∞ | 13.00 | 1.51633 | 64.1 | 12.19 |
| 10 | ∞ | 1.50 | | | 7.26 |
| 11(aperture stop) | ∞ | 1.50 | | | 7.49 |
| 12 | 38.023 | 0.70 | 1.83481 | 42.7 | 7.76 |
| 13 | 10.689 | 3.80 | 1.54072 | 47.2 | 7.75 |
| 14 | −13.743 | 3.25 | | | 8.09 |
| 15 | −17.693 | 3.00 | 1.51633 | 64.1 | 7.85 |
| 16 | −26.895 | 1.53 | | | 9.55 |
| 17 | 33.783 | 3.63 | 1.49700 | 81.5 | 11.19 |
| 18 | −11.380 | 0.85 | 1.80400 | 46.6 | 11.68 |
| 19 | −32.600 | 0.00 | | | 12.52 |
| 20 | 39.031 | 5.77 | 1.49700 | 81.5 | 13.10 |
| 21 | −17.536 | 0.30 | | | 13.89 |
| 22 | 43.756 | 0.75 | 1.95375 | 32.3 | 13.63 |
| 23 | 9.595 | 7.00 | 1.49700 | 81.5 | 13.05 |
| 24 | −29.110 | 13.51 | | | 14.13 |
| Image Plane | ∞ | | | | |

| VARIOUS DATA | |
| --- | --- |
| Focal Length | 5.28 |
| Fno. | 2.80 |
| Half Angle of View (°) | 92.78 |
| Image Height | 8.55 |
| Overall Lens Length | 80.59 |
| BF | 13.51 |

| Entrance Pupil Position | 8.82 |
| --- | --- |
| Exit Pupil Position | −74.16 |
| Front Principal Point Position | 13.78 |
| Rear Principal Point Position | 8.23 |

| Lens Unit Data | | | | | |
| --- | --- | --- | --- | --- | --- |
| Lens Unit | Starting Surface | Focal Length | Lens Structure Length | Front Principal Point Position | Rear Principal Point Position |
| 1 | 1 | 5.28 | 67.08 | 13.78 | 8.23 |

| Fixed Focal Lens Data | | |
| --- | --- | --- |
| Lens | Starting Surface | Focal Length |
| 1 | 1 | −13.51 |
| 2 | 3 | −44.47 |
| 3 | 5 | −11.26 |
| 4 | 7 | 15.17 |
| 5 | 9 | 0.00 |
| 6 | 12 | −18.02 |
| 7 | 13 | 11.76 |
| 8 | 15 | −112.67 |
| 9 | 17 | 17.60 |
| 10 | 18 | −22.14 |
| 11 | 20 | 25.20 |
| 12 | 22 | −13.03 |
| 13 | 23 | 15.45 |

TABLE 1 summarizes various values of each numerical example.

TABLE 1

| | | | EX 1 | EX2 | EX3 | EX4 |
| --- | --- | --- | --- | --- | --- | --- |
| INEQUAL-ITY | (1) | ω | 188.0 | 226.0 | 220.0 | 200.0 |
| | (2) | βL2 | −1.17 | −1.17 | −1.35 | −1.22 |
| | (3) | LA/LB | 1.24 | 0.99 | 0.99 | 0.70 |
| | (4) | LB/LF | 0.29 | 0.34 | 0.34 | 0.42 |
| | (5) | LA/LR | 0.17 | 0.13 | 0.14 | 0.10 |
| | (6) | fL1/f | −0.85 | −0.86 | −0.74 | −0.82 |
| | (7) | fL2/f | −4.58 | −6.90 | −5.50 | −4.82 |
| | (8) | fLN/f | 1.27 | 0.75 | 0.78 | 1.07 |
| | (9) | fLP/f | −6.29 | −4.08 | −3.26 | −3.17 |

Image Pickup Apparatus

Figure 11:
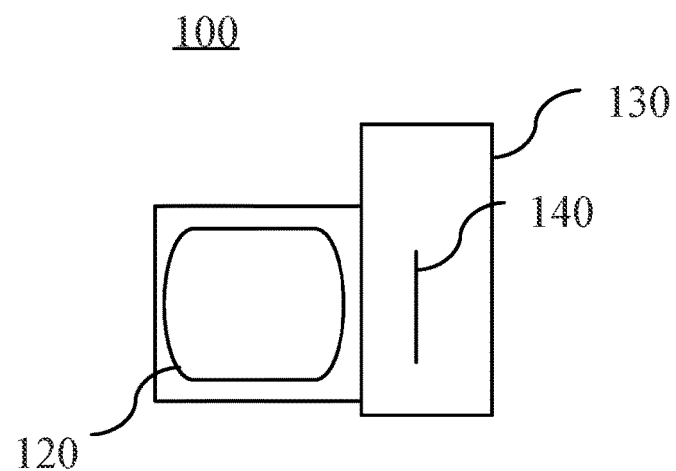
FIG. 11 is a schematic diagram of an image pickup apparatus.

Referring now to FIG. 11, a description will be given of an example of a digital still camera (image pickup apparatus) 100 using the optical system according to each example as an imaging optical system. In FIG. 11, reference numeral 120 denotes any one of the optical systems according to Examples 1 to 4. Reference numeral 140 denotes a solid image sensor (photoelectric conversion element) such as a CCD sensor or a CMOS sensor built in a camera body 130 and configured to receive and photoelectrically convert an optical image formed by the optical system 120. The camera body 130 may be a so-called single-lens reflex camera with a quick turn mirror, or a so-called mirrorless camera without a quick turn mirror.

Applying the optical system according to each example to an image pickup apparatus such as a digital still camera can provide an image pickup apparatus having a small lens.

FIG. 11 illustrates the single optical system 120 but two optical systems are arranged side by side in the depth direction.

Each example can provide a lens apparatus and an image pickup apparatus having the same that can obtain an image with a wide angle of view and reduce an image processing load after imaging.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-180795, filed on Nov. 11, 2022, which is hereby incorporated by reference herein in its entirety.

What is claimed is:

1. A lens apparatus comprising:
a first optical system; and
a second optical system,
wherein the first optical system includes a first reflective optical element configured to reflect light incident along a first direction from an object side toward an image side along a second direction,
wherein the second optical system includes a second reflective optical element configured to reflect light incident from the object side along a third direction different from the first direction toward the image side along the second direction,
wherein an intermediate imaging point and an image point are formed by each of the first optical system and the second optical system, and wherein the following inequality is satisfied:

$$180°<2\omega<270°$$

where $\omega(°)$ is a half angle of view of each of the first optical system and the second optical system.

2. The lens apparatus according to claim 1, wherein each of the first optical system and the second optical system includes a first partial optical system and a second partial optical system that are spaced via a maximum air gap that is located on the image side of the intermediate imaging point and on the object side of a point where a principal ray of an outermost off-axis ray intersects an optical axis, the first partial optical system being located on the object side of the maximum air gap, and the second partial optical system being located on the image side of the maximum air gap, and
wherein each of the first reflective optical element and the second reflective optical element is disposed in the first partial system.

3. The lens apparatus according to claim 2, wherein the following inequality is satisfied:

$$-1.60<\beta L2<-1.02$$

where $\beta L2$ is lateral magnification of the second partial system.

4. The lens apparatus according to claim 1, wherein the following inequality is satisfied:

$$0.55<LA/LB<1.45$$

where LA is a distance on an optical axis from a lens surface on the object side of a lens closest to an object in each of the first optical system and the second optical system, and LB is a distance between the optical axis of the first optical system and the optical axis of the second optical system on image sides of the first reflective optical element and the second reflective optical element.

5. The lens apparatus according to claim 1, wherein the following inequality is satisfied:

$$0.20<LB/LF<0.52$$

where LB is a distance between an optical axis of the first optical system and the optical axis of the second optical system on image sides of the first reflective optical element and the second reflective optical element, and LF is a distance between a vertex of a lens surface on the object side of a lens closest to an object in the first optical system and a vertex of a lens surface on the object side of a lens closest to the object in the second optical system.

6. The lens apparatus according to claim 1, wherein the following inequality is satisfied:

$$0.06<LA/LR<0.23$$

wherein LA is a distance on an optical axis from a lens surface on the object side of a lens closest to an object in each of the first optical system and the second optical system, and LR is a distance on the optical axis from a reflective surface of each of the first reflective optical element and the second reflective optical element to the image point.

7. The lens apparatus according to claim 2, wherein the following inequality is satisfied:

$$-1.10<fL1/f<-0.55$$

where fL1 is a combined focal length of the first partial system in each of the first optical system and the second optical system, and f is a focal length of each of the first optical system and the second optical system.

8. The lens apparatus according to claim 2, wherein the following inequality is satisfied:

$$-7.50<fL2/f<-3.90$$

where fL2 is a combined focal length of the second partial system in each of the first optical system and the second optical system, and f is a focal length of each of the first optical system and the second optical system.

9. The lens apparatus according to claim 2, wherein the following inequality is satisfied:

$$0.50<fLN/f<1.55$$

wherein fLN is a combined focal length of lenses on the object side of each of the first reflective optical element and the second reflective optical element in the first partial system in each of the first optical system and the second optical system, and f is a focal length of each of the first optical system and the second optical system.

10. The lens apparatus according to claim 2, wherein the following inequality is satisfied:

$$-7.50<fLP/f<-2.70$$

wherein fLP is a combined focal length of lenses on the image side of each of the first reflective optical element and the second reflective optical element in the first partial system in each of the first optical system and the second optical system, and f is a focal length of each of the first optical system and the second optical system.

11. The lens apparatus according to claim 1, wherein the first direction and the third direction are opposite to each other.

12. The lens apparatus according to claim 2, wherein the first partial system in each of the first optical system and the second optical system includes:
a first lens unit having negative refractive power on the object side of each of the first reflective optical element and the second reflective optical element, and
a second lens unit with positive refractive power disposed on the image side of each of the first reflective optical element and the second reflective optical element.

13. The lens apparatus according to claim 12, wherein the first lens unit includes a negative meniscus lens with a lens surface that is convex on the object side, and a biconvex lens disposed on the image side of the negative meniscus lens.

14. The lens apparatus according to claim 12, wherein the first lens unit includes, in order from the object side to the image side, two negative meniscus lenses with lens surfaces that are convex on the object side.

15. The lens apparatus according to claim 14, wherein a lens disposed closest to an object among lenses included in the first lens unit has an aspheric lens surface on the object side.

16. The lens apparatus according to claim 14, wherein the first lens unit includes, in order from the object side to the image side, three negative meniscus lenses with lens surfaces that are convex on the object side.

17. The lens apparatus according to claim 16, wherein a lens disposed closest to an object among lenses included in the first lens unit has an aspheric lens surface on the object side.

18. The lens apparatus according to claim 14, wherein the first lens unit includes, in order from the object side to the image side, two negative meniscus lenses with lens surfaces that are convex on the object side.

19. The lens apparatus according to claim 18, wherein a lens disposed closest to an object among lenses included in the first lens unit has an aspheric lens surface on the object side.

20. The lens apparatus according to claim 1, wherein the first optical system and the second optical system are arranged so that an optical axis of the first optical system and an optical axis of the second optical system are positioned on the same plane.

21. An image pickup apparatus comprising:
a lens apparatus; and
an image sensor configured to receive image light formed by each of the first optical system and the second optical system,
wherein the lens apparatus comprising:
a first optical system; and
a second optical system,
wherein the first optical system includes a first reflective optical element configured to reflect light incident along a first direction from an object side toward an image side along a second direction,
wherein the second optical system includes a second reflective optical element configured to reflect light incident from the object side along a third direction different from the first direction toward the image side along the second direction,
wherein an intermediate imaging point and an image point are formed by each of the first optical system and the second optical system, and
wherein the following inequality is satisfied:

$$180° < 2\omega < 270°$$

where $\omega(°)$ is a half angle of view of each of the first optical system and the second optical system.

* * * * *